No. 747,643. Patented December 22, 1903.

UNITED STATES PATENT OFFICE.

NIKLAUS RONGGER, OF BASLE, SWITZERLAND, ASSIGNOR TO CORPORATION OF CHEMICAL WORKS FORMERLY SANDOZ OF BASLE, SWITZERLAND.

BLUE SULFUR DYESTUFF AND PROCESS OF MAKING SAME.

SPECIFICATION forming part of Letters Patent No. 747,643, dated December 22, 1903.

Application filed July 14, 1903. Serial No. 165,522. (Specimens.)

*To all whom it may concern:*

Be it known that I, NIKLAUS RONGGER, doctor of philosophy, residing at 60 Fabrikstrasse, Basle, Switzerland, have invented new and useful Improvements in Blue Sulfur Dye, of which the following is a specification.

Hitherto the sulfur colors deriving from leuco indophenols have been prepared in a general way by heating the indophenols or their leuco compounds with alkali polysulfids at temperatures not exceeding, as a rule, 120° centigrade. At higher temperatures dyestuffs of more blackish blue and duller shade are formed.

Now I have discovered that the para-oxy-para-amido meta-methyl-diphenylamin described in the United States Patent No. 709,151 can be transformed in a very valuable blue sulfur dye by simply heating it with sulfur at elevated temperatures varying from 170° to 210° centigrade. A strong current of sulfureted hydrogen is developed in the reaction, and after two hours the entire process is complete. The melt can be used directly for dyeing without any further purification. By adding to the ingredients of the melt a small quantity of chromium hydroxid the shade of the resulting dyestuff becomes a trifle more reddish and brighter, the general properties of the product remaining, however, unaltered.

The following example will illustrate my invention and in what manner the same can be carried out into practical effect. The parts are by weight.

Six parts of para-oxy-para-amido meta-methyl-diphenylamin, five parts of sulfur, and .2 parts of chromium hydroxid ($Cr_2O_3, H_2O$) are heated in an iron vessel provided with an agitator to 190° to 200° centigrade—temperature of the oil-bath. The reaction sets in very quickly, accompanied by a strong development of sulfureted hydrogen. It slows down toward the end of the process. After two hours stirring the melt, which is at first liquid, becomes thick. It is then cooled down, when a brittle blackish violet mass is obtained, which can be easily powdered and used directly for dyeing.

The dyestuff thus produced is completely insoluble in water, but dissolves readily in presence of alkaline sulfids—viz., with a blue color in the cold, and at boiling forming a vat with a slightly-brownish coloration which dyes unmordanted cotton, preferably at ordinary temperature, with remarkable affinity—whereas the dyestuff obtained from the same diphenylamin derivative according to the United States Patent No. 709,151 before mentioned produces at first slightly red-brown shades, which oxidize on exposure to the air through reddish violet to blue. The sulfur dye produced according to the present invention turns out of the dyeing-kettle slightly grayish green and oxidizes on exposure to the air directly to an intense indigo blue fast to alkalies, washing, and light.

If the melt of the foregoing example is made without addition of chromium hydroxid, a dyestuff having the same general properties is obtained, which, however, dyes slightly duller and more greenish shades.

In order to isolate the dyestuff in a pure state from the melt, the solution of the latter in diluted sodium sulfid can be precipitated by oxidation with a current of air, or the leuco compound may be separated by addition of a mineral acid, filtered, washed, and dried, and afterward freed from the sulfur still contained therein by extraction with carbon disulfid. On exposure to the air the dyestuff is obtained as a dark blue powder, insoluble in water and alcohol, soluble in cold sulfuric acid with a blue color, which turns to gray on heating. It dissolves very easily in diluted alkaline sulfids with a blue color in the cold, which is discolored to a slight brown on boiling.

Now what I claim, and desire to secure by Letters Patent, is the following:

1. The process herein described for the manufacture of a blue sulfur dyestuff which consists in heating para-oxy-para-amido-meta-methyl-diphenylamin with sulfur to 170° to 210° centigrade.

2. The process herein described for the manufacture of a blue sulfur dyestuff which consists in heating para-oxy-para-amido-meta-methyl-diphenylamin with sulfur to 170° to 210° centigrade in the presence of chromium hydroxid.

3. As a new article of manufacture, the dyestuff herein described obtained from para-oxy-para-amido-meta-methyl-diphenylamin, being a dark blue powder, insoluble in water and alcohol, easily soluble in cold diluted alkaline sulfids with a blue color which is changed to a slight brown on boiling, dissolving in cold strong sulfuric acid with blue color and dyeing unmordanted cotton in a bath containing alkaline sulfids blue shades fast to alkalies, washing and light.

In testimony whereof I have signed my name to this specification in the presence of two subscribing witnesses.

NIKLAUS RONGGER.

Witnesses:
GEO. GIFFORD,
MELCHIOR BÖNIGER.